United States Patent
Chuang et al.

(10) Patent No.: US 12,500,411 B2
(45) Date of Patent: Dec. 16, 2025

(54) TRIGGER CIRCUIT AND OPERATING CIRCUIT

(71) Applicant: Vanguard International Semiconductor Corporation, Hsinchu (TW)

(72) Inventors: Jung-Tsun Chuang, Tainan (TW); Chieh-Yao Chuang, Kaohsiung (TW); Chun-Chih Chen, New Taipei (TW); Chien-Wei Wang, Taoyuan (TW); Yeh-Ning Jou, Hsinchu (TW); Wei-Ting Chen, Kaohsiung (TW)

(73) Assignee: VANGUARD INTERNATIONAL SEMICONDUCTOR CORPORATION, Hsinchu (TW)

( * ) Notice: Subject to any disclaimer, the term of this patent is extended or adjusted under 35 U.S.C. 154(b) by 142 days.

(21) Appl. No.: 18/602,570

(22) Filed: Mar. 12, 2024

(65) Prior Publication Data
US 2025/0293513 A1    Sep. 18, 2025

(51) Int. Cl.
*H02H 9/04*    (2006.01)

(52) U.S. Cl.
CPC .................. *H02H 9/046* (2013.01)

(58) Field of Classification Search
CPC ..................................... H02H 9/046
See application file for complete search history.

(56) References Cited

U.S. PATENT DOCUMENTS

| | | | | |
|---|---|---|---|---|
| 11,855,452 B2 * | 12/2023 | Fan | ........................ | H02H 9/046 |
| 2004/0240129 A1 * | 12/2004 | Moldauer | .............. | H02H 9/046 |
| | | | | 361/56 |
| 2008/0297960 A1 * | 12/2008 | Chen | .................... | H10D 89/819 |
| | | | | 361/56 |
| 2009/0168280 A1 * | 7/2009 | Huang | ................... | H02H 9/046 |
| | | | | 361/56 |
| 2013/0027821 A1 | 1/2013 | Chen et al. | | |
| 2016/0218503 A1 * | 7/2016 | La Rosa | .............. | H10D 89/611 |
| 2018/0159323 A1 * | 6/2018 | Huang | ................. | H10D 89/811 |

FOREIGN PATENT DOCUMENTS

TW        201429099 A        7/2014

OTHER PUBLICATIONS

Taiwanese Office Action and Search Report for Taiwanese Application No. 113102435, dated Nov. 29, 2024.

\* cited by examiner

*Primary Examiner* — Dharti H Patel
(74) *Attorney, Agent, or Firm* — Birch, Stewart, Kolasch & Birch, LLP

(57) ABSTRACT

A trigger circuit coupled between an input-output pad and a core circuit and including an adjustment circuit and a protection circuit is provided. The adjustment circuit adjusts the voltage of the input-output pad to generate an output voltage. The protection circuit is coupled between the adjustment circuit and the core circuit and receives a system enable signal. In response to the system enable signal being disabled or an electrostatic discharge (ESD) event occurring on the input-output pad, the protection circuit disables the core circuit according to the output voltage. In response to the system enable signal being enabled, the protection circuit stops disabling the core circuit.

20 Claims, 5 Drawing Sheets

TRIGGER CIRCUIT AND OPERATING CIRCUIT

BACKGROUND OF THE INVENTION

Field of the Invention

The present invention relates to a trigger circuit, and, in particular, to a trigger circuit device that turns off important elements during an electrostatic discharge (ESD) event.

Description of the Related Art

As the semiconductor manufacturing process has developed, electrostatic discharge (ESD) protection has become one of the most critical reliability issues for integrated circuits (IC). In particular, as semiconductor processing advances into the deep sub-micron stage, scaled-down devices and thinner gate oxides are more vulnerable to ESD stress. Generally, the input-output pads on IC chips are required to sustain 2000V ESD stress in high Human Body Mode (HBM), and 200V in Machine Mode.

BRIEF SUMMARY OF THE INVENTION

In accordance with an embodiment of the disclosure, a trigger circuit is coupled between an input-output pad and a core circuit and comprises an adjustment circuit and a protection circuit. The adjustment circuit adjusts the voltage of the input-output pad to generate an output voltage. The protection circuit is coupled between the adjustment circuit and the core circuit and receives a system enable signal. In response to the system enable signal being disabled or an electrostatic discharge (ESD) event occurring on the input-output pad, the protection circuit disables the core circuit according to the output voltage. In response to the system enable signal being enabled, the protection circuit stops disabling the core circuit.

In accordance with another embodiment of the disclosure, an operating circuit comprises a core circuit and a trigger circuit. The core circuit is configured to set the voltage of an input-output pad. The trigger circuit is coupled to the input-output pad and comprises an adjustment circuit and a protection circuit. The adjustment circuit adjusts the voltage of the input-output pad to generate an output voltage. The protection circuit is coupled between the adjustment circuit and the core circuit and receives a system enable signal. In response to the system enable signal being disabled or an ESD event occurring on the input-output pad, the protection circuit disables the core circuit according to the output voltage. In response to the system enable signal being enabled, the protection circuit stops disabling the core circuit.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
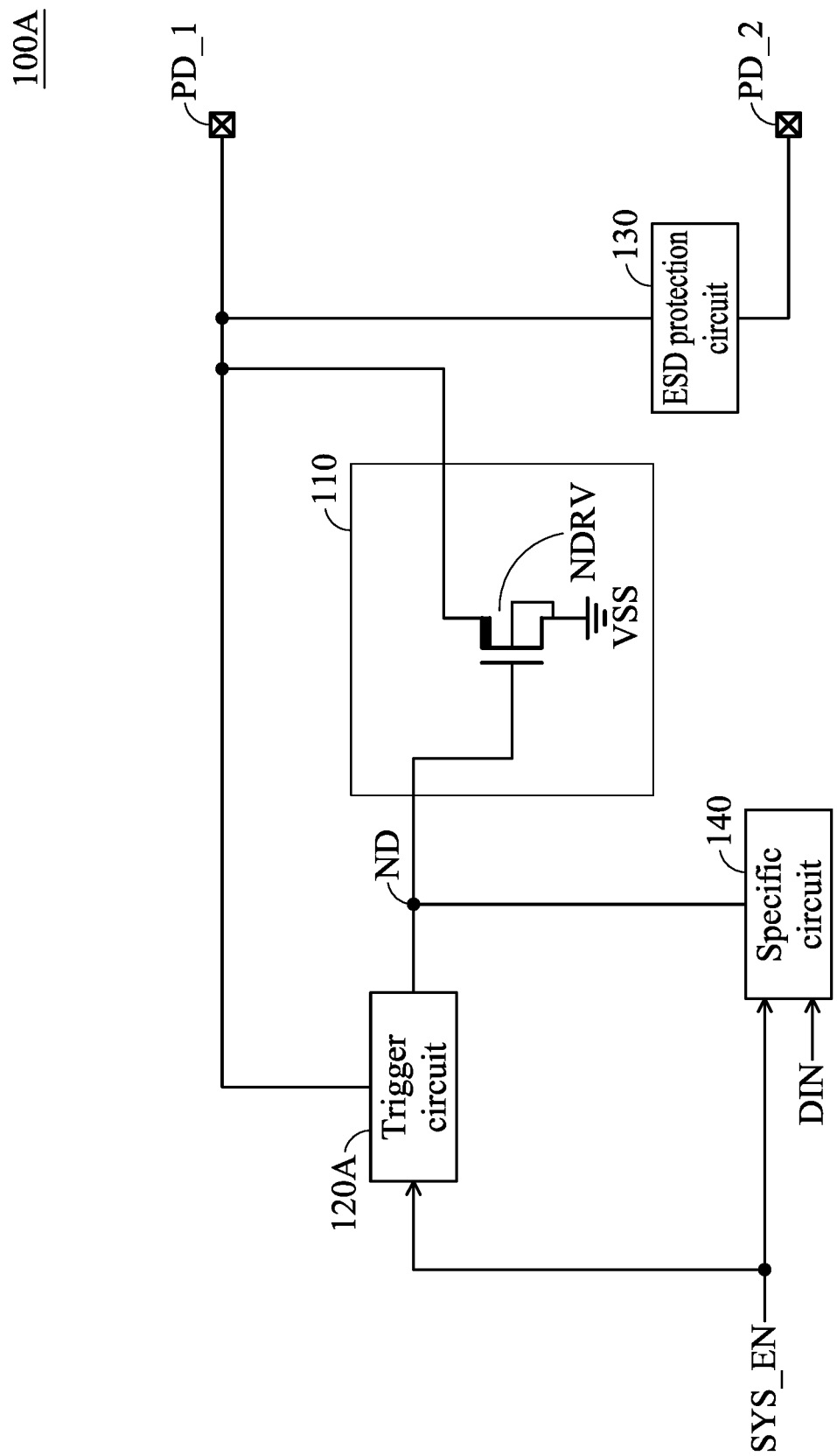
FIG. 1A is a schematic diagram of an exemplary embodiment of an operating circuit according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1A is a schematic diagram of an exemplary embodiment of an operating circuit according to various aspects of the present disclosure. The operating circuit 100A comprises a core circuit 110 and a trigger circuit 120A. The core circuit 110 is coupled between a node ND and an input-output pad PD_1. In this embodiment, the core circuit 110 sets the voltage of the input-output pad PD_1 according to the voltage of the node ND. For example, when the voltage of the node ND is equal to a first voltage, the core circuit 110 sets the voltage of the input-output pad PD_1 is equal to a second voltage. The first voltage may be higher than or lower than the second voltage.

The structure of the core circuit 110 is not limited in the present disclosure. In one embodiment, the core circuit 110 comprises a driving transistor NDRV. The driving transistor NDRV sets the voltage of the input-output pad PD_1 according to the voltage of the node ND. For example, when the voltage of the node ND is a high voltage, the driving transistor NDRV is turned on. Therefore, the voltage of the input-output pad PD_1 is about equal to an operation voltage VSS, such as 0V. When the voltage of the node ND is a low voltage, the driving transistor NDRV is turned off. Therefore, the voltage of the input-output pad PD_1 is not equal to the operation voltage VSS.

In this embodiment, the driving transistor NDRV is an N-type transistor, but the disclosure is not limited thereto. In other embodiments, the driving transistor NDRV is a P-type transistor. As shown in FIG. 1A, the gate of the driving transistor NDRV is coupled to the node ND. The drain of the driving transistor NDRV is coupled to the input-output pad PD_1. The source of the driving transistor NDRV receives the operation voltage VSS, which may be referred to as a first operation voltage.

In some embodiments, the driving transistor NDRV is a low-gate high-drain transistor. In this case, the drain of the driving transistor NDRV can withstand a higher voltage than the gate of the driving transistor NDRV. For example, the maximum voltage that the gate of the driving transistor NDRV is capable of withstanding may be 6V, and the maximum voltage that the drain of the driving transistor NDRV is capable of withstanding may be 20V.

The trigger circuit 120A is coupled to the input-output pad PD_1 and the core circuit 110 and receives a system enable signal SYS_EN. When the system enable signal SYS_EN is disabled, the trigger circuit 120A disables the core circuit 110 so that the core circuit 110 stops setting the voltage of the input-output pad PD_1. When the system enable signal SYS_EN is enabled, the trigger circuit 120A stops disabling the core circuit 110. Therefore, the core circuit 110 sets the voltage of the input-output pad PD_1 according to the voltage of the node ND. In one embodiment, when an electrostatic discharge (ESD) event occurs on the input-output pad PD_1, the trigger circuit 120A disables the core circuit 110 to avoid an ESD current from the input-output pad PD_1 from entering and damaging the core circuit 110.

In other embodiments, the operating circuit 100A further comprises an ESD protection circuit 130. The ESD protection circuit 130 is coupled to the input-output pad PD_1. When an ESD event occurs on the input-output pad PD_1, the ESD protection circuit 130 releases an ESD current to avoid the ESD current from entering the core circuit 110. In one embodiment, the ESD protection circuit 130 is further coupled to an input-output pad PD_2. In this case, when an ESD event occurs on the input-output pad PD_1 and the input-output pad PD_2 is coupled to ground, the ESD protection circuit 130 provides a discharge path. An ESD current is released from the input-output pad PD_1, passes the ESD protection circuit 130 and enters the input-output pad PD_2.

In some embodiments, the operating circuit 100A further comprises a specific circuit 140. The specific circuit 140 receives the system enable signal SYS_EN and an input signal DIN. When the system enable signal SYS_EN is enabled, the specific circuit 140 sets the voltage of the node ND according to the input signal DIN. For example, when the input signal DIN is a third voltage, the voltage of the node ND may be equal to a fourth voltage. When the input signal DIN is a fifth voltage, the voltage of the node ND may be equal to a sixth voltage. The third voltage is opposite of the fifth voltage. The fourth voltage is opposite of the sixth voltage. Additionally, the third voltage may be higher than or lower than the fourth voltage. The fifth voltage may be higher than or lower than the sixth voltage. However, when the system enable signal SYS_EN is disabled, the specific circuit 140 stops setting the voltage of the node ND. At this time, the voltage of the node ND may be 0V.

Figure 1B:
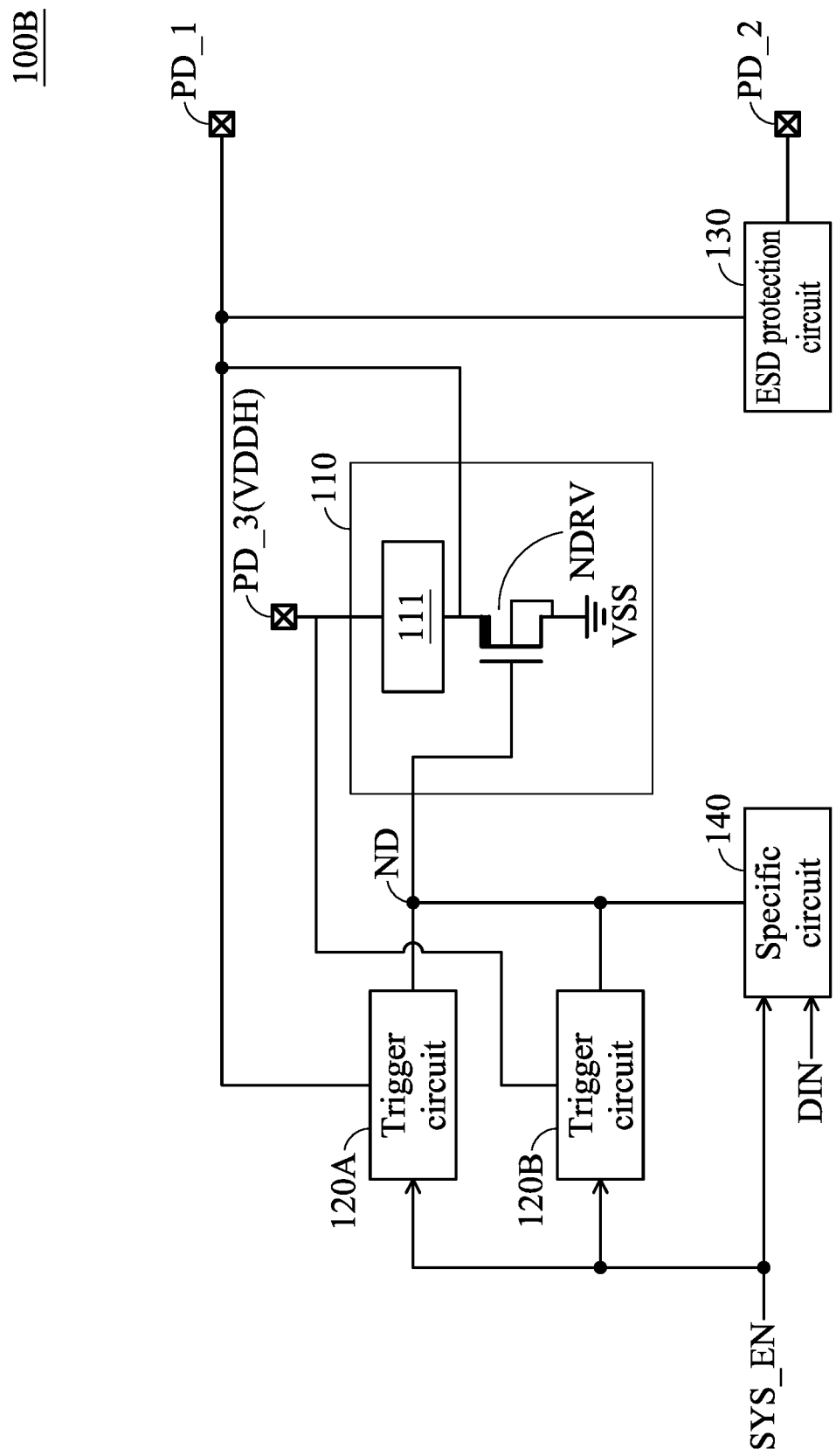
FIG. 1B is a schematic diagram of another exemplary embodiment of the operating circuit according to various aspects of the present disclosure.

FIG. 1B is a schematic diagram of another exemplary embodiment of the operating circuit according to various aspects of the present disclosure. FIG. 1B is similar to FIG. 1A except for the addition of a trigger circuit 120B. The trigger circuit 120B is coupled to a input-output pad PD_3 and the core circuit 110 and receives the system enable signal SYS_EN.

When the system enable signal SYS_EN is disabled, the trigger circuit 120B disables the core circuit 110 so that the core circuit 110 stops setting the voltage of the input-output pad PD_1. When the system enable signal SYS_EN is enabled, the trigger circuit 120B stops disabling the core circuit 110. Therefore, the core circuit 110 sets the voltage of the input-output pad PD_1 according to the voltage of the node ND. In one embodiment, when an ESD event occurs on the input-output pad PD_3, the trigger circuit 120B disables the core circuit 110 to avoid an ESD current from the input-output pad PD_3 from entering and damaging the core circuit 110.

The uses of the input-output pads PD_1 and PD_3 are not limited in the present disclosure. In one embodiment, the input-output pad PD_1 or PD3 is used as an output terminal to output a signal. In another embodiment, the input-output pad PD_1 or PD_3 is used as an input terminal to receive an operation voltage. The use of the input-output pad PD_1 may be the same as or different from the use of the input-output pad PD_3. For example, the input-output pad PD_1 is used as an output terminal to output a signal, and the input-output pad PD_3 is used as an input terminal to receive a signal or power.

The number of trigger circuits is not limited in the present disclosure. In other embodiments, the operating circuit 100B comprises more trigger circuits. Different trigger circuits are coupled to different input-output pads to avoid the ESD current from different input-output pads from entering the core circuit 110. In this case, each trigger circuit receives the system enable signal SYS_EN.

In some embodiments, the core circuit 110 comprises a high side controller 111 and a driving transistor NDRV. The high side controller 111 is coupled between the input-output pad PD_3 and the driving transistor NDRV. In one embodiment, the high side controller 111 sets the voltage of the input-output pad PD_1 to equal to the voltage of the input-output pad PD_3. In some embodiments, the input-output pad PD_3 receives an operation voltage VDDH. The operation voltage VDDH is higher than the operation voltage VSS.

The circuit structure of the high side controller 111 is not limited in the present disclosure. Any circuit can serve as the high side controller 111, as long as the circuit is capable of setting the voltage of the input-output pad PD_1 into a high level. In this embodiment, the driving transistor NDRV is a low side controller to set the voltage of the input-output pad PD_1 into a low level.

Figure 2:
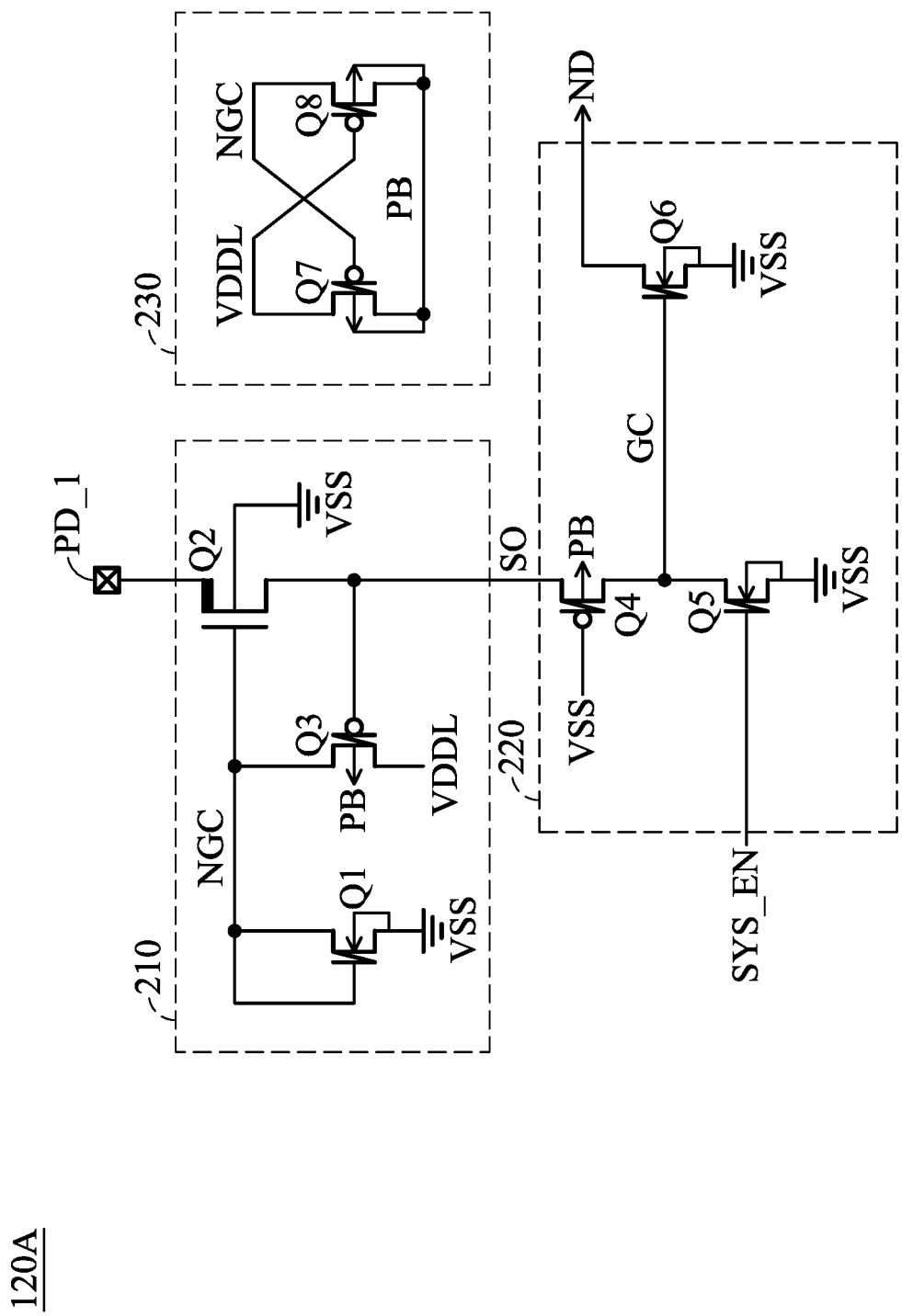
FIG. 2 is a schematic diagram of an exemplary embodiment of a trigger circuit according to various aspects of the present disclosure.

FIG. 2 is a schematic diagram of an exemplary embodiment of a trigger circuit according to various aspects of the present disclosure. Since the structure of the trigger circuit 120A is the same as the structure of the trigger circuit 120B, FIG. 2 only shows the structure of the trigger circuit 120A. As shown in FIG. 2, the trigger circuit 120A comprises an adjustment circuit 210 and a protection circuit 220. The adjustment circuit 210 is coupled to the input-output pad PD_1 and adjusts the voltage of the input-output pad PD_1 to generate an output voltage SO. The protection circuit 220 is coupled between the adjustment circuit 210 and the core circuit 110 and receives the system enable signal SYS_EN.

In other embodiments, the trigger circuit 120B shown in FIG. 1B comprises another adjustment circuit (referred to as a second adjustment circuit) and another protection circuit (referred to as a second protection circuit). In this case, the second adjustment circuit is coupled to the input-output pad PD_3 and adjusts the voltage of the input-output pad PD_3 to generate another output voltage (referred to as a second output voltage). The second protection circuit is coupled between the second adjustment circuit and the core circuit 110 and receives the system enable signal SYS_EN.

Since the operation of the trigger circuit 120B is the same as the operation of the trigger circuit 120A, the trigger circuit 120A is given as an example to describe the operation of the trigger circuit 120A. When the system enable signal SYS_EN is disabled or an ESD event occurs on the input-output pad PD_1, the protection circuit 220 sets the voltage of the node ND according to the output voltage SO to disable the core circuit 110. When the system enable signal SYS_EN is enabled, the protection circuit 220 stops setting the voltage of the node ND to suspend the disabling of the core circuit 110.

In one embodiment, the adjustment circuit 210 comprises transistors Q1-Q3. The gate of the transistor Q1 is coupled to the drain of the transistor Q1. The source of the transistor Q1 receives the operation voltage VSS. The gate of the transistor Q2 is coupled to the gate of the transistor Q1. The drain of the transistor Q2 is coupled to the input-output pad PD_1. In one embodiment, the transistor Q2 is a low-gate high-drain transistor. In this case, the drain of the transistor Q2 is capable of accepting high voltage, such as more than 10V. Therefore, when an ESD event occurs on the input-output pad PD_1, the transistor Q2 does not be damaged by an ESD current. The gate of the transistor Q3 is coupled to the source of the transistor Q2. The drain of the transistor Q3 is coupled to the drain of the transistor Q1. The source of the transistor Q3 receives an operation voltage VDDL (referred to as a second operation voltage). In some embodiments, the transistors Q1 and Q2 are N-type transistors, and the transistor Q3 is a P-type transistor.

In other embodiments, the drain of the transistor Q2 may be coupled to the input-output pad PD_3. In this case, in an normal mode (the system enable signal SYS_EN is enabled), the voltage of the input-output pad PD_3 is higher than the operation voltage VDDL and the operation voltage VDDL is higher than the operation voltage VSS. For example, the voltage of the input-output pad PD_3 may be 12V, the operation voltage VDDL may be 6V, and the operation voltage VSS may be 0V.

The protection circuit 220 comprises transistors Q4-Q6. The gate of the transistor Q4 receives the operation voltage VSS. The source of the transistor Q4 is coupled to the source of the transistor Q2. The gate of the transistor Q5 receives the system enable signal SYS_EN. The drain of the transistor Q5 is coupled to the drain of the transistor Q4. The source of the transistor Q5 receives the operation voltage VSS. The gate of the transistor Q6 is coupled to the drain of the transistor Q5. The drain of the transistor Q6 is coupled to the core circuit 110. The source of the transistor Q6 receives the operation voltage VSS. In some embodiments, the transistor Q4 is a P-type transistor, and the transistors Q5 and Q6 are N-type transistors.

In other embodiments, the trigger circuit 120A further comprises a level set circuit 230. The level set circuit 230 provides a setting voltage PB to the bulks of the transistors Q3 and Q4. In this case, since the setting voltage PB is equal to the source voltage of the transistor Q3, the parasitical diode (not shown) between the source and bulk of the transistor Q3 is not turned on to avoid a leakage current from passing the transistor Q3. Additionally, the setting voltage PB is higher than the drain voltage of the transistor Q3. Therefore, the parasitical diode between the drain and bulk of the transistor Q3 is also not turned on. In addition, since the setting voltage PB is higher than the source voltage and the drain voltage of the transistor Q4, the parasitical diode between the source and bulk of the transistor Q4 and the parasitic diode between the drain and bulk of the transistor Q4 are not turned on.

The structure of level set circuit 230 is not limited in the present disclosure. In one embodiment, the level set circuit 230 comprises transistors Q7 and Q8. The gate of the transistor Q7 is coupled to the drain of the transistor Q1. The drain of the transistor Q7 is coupled to the bulks of the transistors Q3 and Q4. The source of the transistor Q7 receives the operation voltage VDDL. The gate of the transistor Q8 receives the operation voltage VDDL. The drain of the transistor Q8 is coupled to the bulks of the transistors Q3 and Q4. The source of the transistor Q8 is coupled to the gate of the transistor Q7. In some embodiments, the transistors Q7 and Q8 are P-type transistors.

Figure 3:
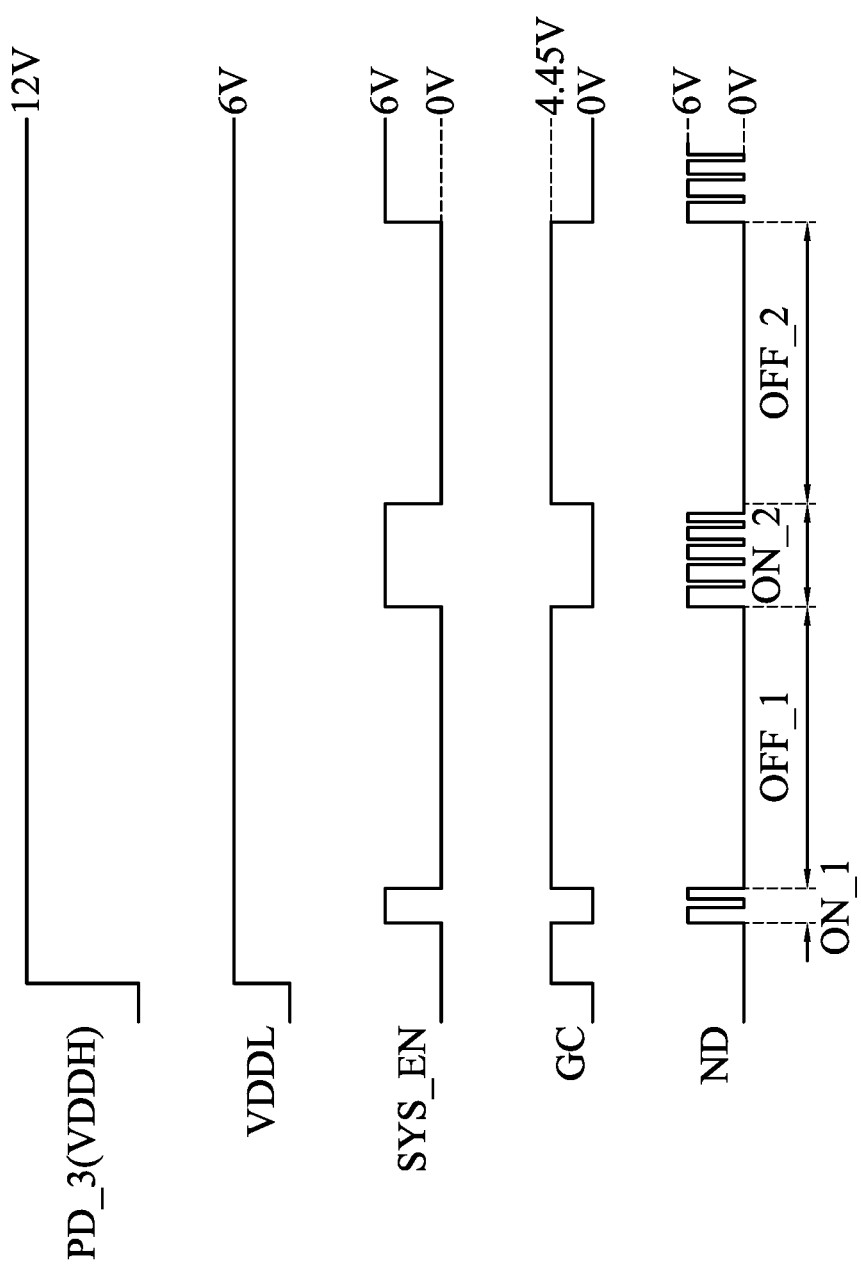
FIG. 3 is a schematic diagram of an exemplary embodiment of the operation of the trigger circuit according to various aspects of the present disclosure.

FIG. 3 is a schematic diagram of an exemplary embodiment of the operation of the trigger circuit 120A according to various aspects of the present disclosure. When the operating circuit 100A is powered on, the input-output pad PD_3 receives the operation voltage VDDH, such as 12V. At this time, the operation voltage VDDL may be 6V. In periods ON_1 and ON_2, the system enable signal SYS_EN is enabled. Therefore, the trigger circuit 120A operates in a normal-on mode. In this embodiment, when the system enable signal SYS_EN is enabled, the voltage of the system enable signal SYS_EN is at a high level, such as 6V.

Refer to FIG. 2. In the normal-on mode, since the system enable signal SYS_EN is enabled, the transistor Q5 is turned on. Therefore, the voltage of the signal GC is close to the operation voltage VSS, such as 0V. Since the transistor Q6 is turned off, the protection circuit 220 stops controlling the voltage of the node ND. At this time, the voltage of the node ND is controlled by a specific circuit (e.g., 140).

In the normal-on mode, since the transistor Q1 is served as a pull-high element and the transistor Q1 is a diode connection structure, the voltage of the signal NGC is approximately the sum of the operation voltage VSS and the threshold voltage of the transistor Q1. In one embodiment, the voltage level of the signal NGC is about 0.7V~1V. Therefore, the transistor Q2 is turned on slightly, and the output voltage SO is about 0.3V (the gate voltage 1V of the transistor Q2 minus the threshold voltage 0.7V of the transistor Q2). The transistor Q3 is turned on so that the transistor Q2 is turned on continuously. At this time, the output voltage SO may be increased to 2V. However, since the transistor Q5 is turned on, the signal GC is approximately 0V so that the transistor Q4 is not easily turned on. Therefore, the voltage level of the signal GC is maintained at 0V.

In periods OFF_1 and OFF_2, the system enable signal SYS_EN is disabled. In one embodiment, when the system enable signal SYS_EN is disabled, the voltage level of the system enable signal SYS_EN may be a low level, such as 0V. Additionally, in periods OFF_1 and OFF_2, the trigger circuit 120A operates in a normal-off mode. In the normal-off mode, the system enable signal SYS_EN is disabled so that the transistor Q5 is turned off.

Since the level of the signal NGC is about 0.7V~1V, the transistor Q2 is turned on slightly. Therefore, the output voltage SO is approximately 0.3V so that the transistor Q3 is turned on and the transistor Q2 is turned on continuously. In this case, the transistors Q2 and Q3 form a negative feedback circuit. The output voltage SO may be increased to 2V. Since the transistor Q5 is turned off, the transistor Q4 is turned on. The voltage of the signal GC is increased. In one embodiment, the voltage of the signal GC is approximately 4.45V. Since the voltage of the signal GC is higher than the threshold voltage of the transistor Q6, the transistor Q6 is turned on so that the voltage of the node ND is approximately equal to the operation voltage VSS.

In one embodiment, the maximum value of the output voltage SO is about equal to the operation voltage VDDL minus the threshold voltage of the transistor Q2. In other embodiments, the voltage of the signal GC is related to the size of the transistor, such as the channel size. Therefore, by using different size transistors, the signal GC is at different voltage levels.

Figure 4:
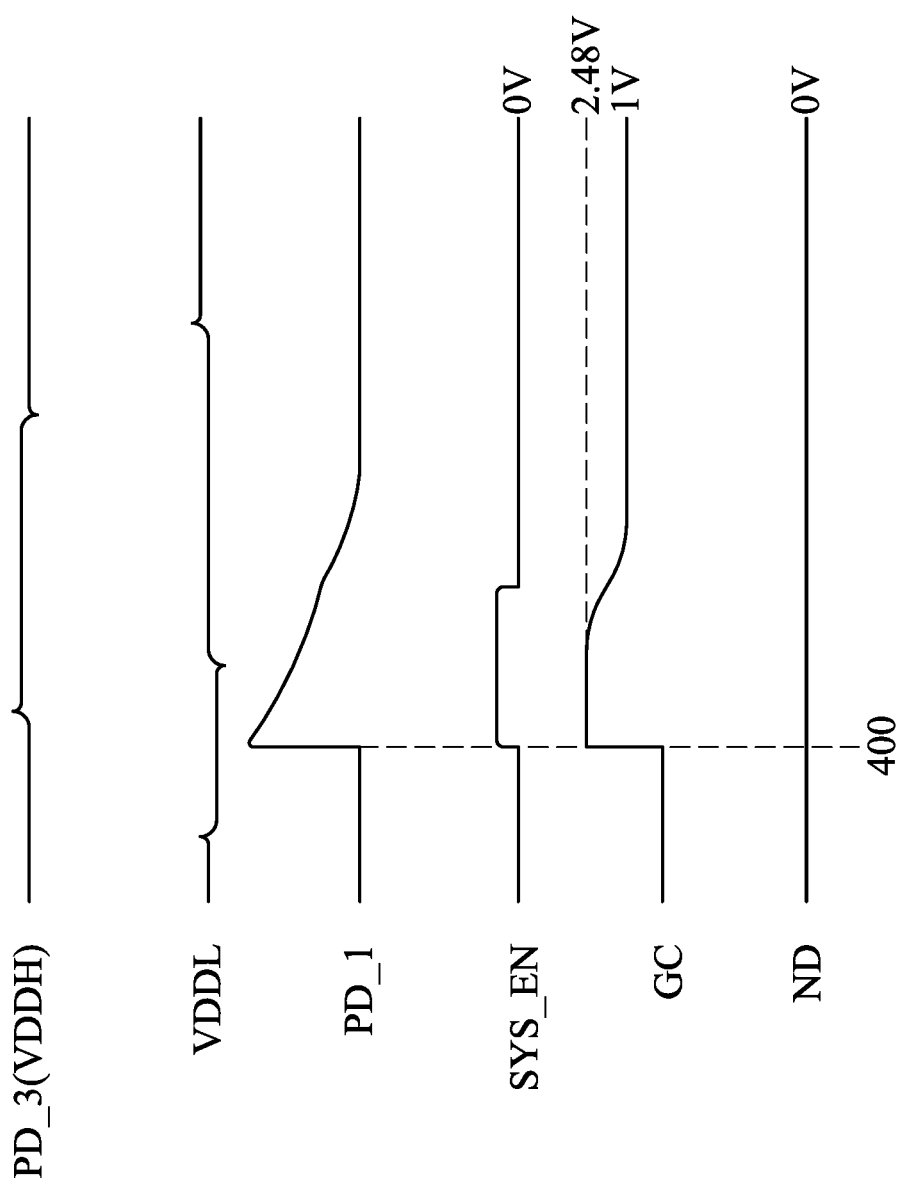
FIG. 4 is a schematic diagram of another exemplary embodiment of the trigger circuit according to various aspects of the present disclosure.

FIG. 4 is a schematic diagram of another exemplary embodiment of the operation of the trigger circuit 120A according to various aspects of the present disclosure. when the operating circuit 100A is not powered on, the operation voltage VDDL is at a floating level. The operation voltage VDDH of the input-output pad PD_3 is also at a floating level. In one embodiment, a circuit (not shown) generates the system enable signal SYS_EN according to the operation voltage VDDL. In this case, since the operation voltage VDDL is at a floating level, the circuit cannot generate the system enable signal SYS_EN. Therefore, the voltage level of the system enable signal SYS_EN may be 0V or a lower floating level. At this time, the transistor Q5 is turned off.

At time point 400, an ESD event occurs on the input-output pad PD_1. Therefore, the trigger circuit 120A enters a protection mode. Refer to FIG. 2, the voltage level of the signal NGC is about 0.7V~1V in the protection mode. Therefore, the transistor Q2 is turned on marginally. At this time, the output voltage SO is about 0.3V so that the transistor Q3 is turned on and the transistor Q2 is still turned on. The output voltage SO may be increased to 2V. Since the transistor Q5 is turned off, the transistor Q4 is turned on. Therefore, the voltage level of the signal GC is increased. At this time, the voltage of the signal GC may be 2.48V. Sine the voltage level of the signal GC is higher than the threshold voltage of the transistor Q6, the transistor Q6 is turned on. Therefore, the voltage level of the node ND is about equal to the operation voltage VSS.

Refer to FIG. 1A. When the voltage level of the node ND is equal to the operation voltage VSS, the core circuit 110 is turned off. Therefore, the ESD current does not enter the core circuit 110 from the input-output pad PD_1. In some embodiments, when an ESD event occurs in the input-output pad PD_1 or PD_3, the gate voltage of the driving transistor NDRV of the core circuit 110 is equal to the operation voltage VSS. Therefore, the driving transistor NDRV is turned off. Since the ESD current does not pass through the driving transistor NDRV, the driving transistor NDRV is protected and safe. Additionally, when the ESD current is released, the voltage level of the signal GC is gradually reduced, such as from 2.48V to 1V.

In the normal-on mode and the normal-off mode, the operation voltage VDDL is approximately equal to 6V and the voltage level of the signal NGC is approximately equal to 0.7V~1V. Therefore, the transistor Q7 of the level set circuit 230 is turned on so that the setting voltage PB is approximately equal to the operation voltage VDDL. Since the bulk voltages of the transistors Q3 and Q4 are approximately equal to the operation voltage VDDL, the parasitical diodes of the transistors Q3 and Q4 are turned off to avoid the leakage current.

In other embodiments, when an ESD event occurs in the input-output pad PD_3, the protection circuit (not shown) of the trigger circuit 120B sets the voltage level of the node ND to a low level, such as 0V. Therefore, the driving transistor NDRV of the core circuit 110 is turned off so that an ESD current does not pass through the driving transistor NDRV.

It will be understood that when an element is referred to as being "on", "connected to" or "coupled to" another element, it can be directly on, connected or coupled to the other element or intervening elements may be present. In contrast, when an element is referred to as be "directly on", "directly connected to" or "directly coupled to" another element, there are no intervening elements present. Additionally, "enable" shall mean changing the state of a Boolean signal. Boolean signals may be enabled high or with a higher voltage, and Boolean signals may be enabled low or with a lower voltage, at the discretion of the circuit designer. Similarly, "disable" shall mean changing the state of the Boolean signal to the voltage level opposite the enabled state.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another. In the following claims, the terms "first," "second," etc. are used merely as labels, and are not intended to impose numerical requirements on their objects.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A trigger circuit coupled between an input-output pad and a core circuit and comprising:
   an adjustment circuit adjusting a voltage of the input-output pad to generate an output voltage; and
   a protection circuit coupled between the adjustment circuit and the core circuit and receiving a system enable signal,
   wherein:
   in response to the system enable signal being disabled or an electrostatic discharge (ESD) event occurring on the input-output pad, the protection circuit disables the core circuit according to the output voltage, and
   in response to the system enable signal being enabled, the protection circuit stops disabling the core circuit.

2. The trigger circuit as claimed in claim 1, wherein the adjustment circuit comprises:
   a first transistor comprising a first gate, a first drain, and a first source, wherein the first gate is coupled to the first drain, and the first source receives a first operation voltage;
   a second transistor comprising a second gate, a second drain, and a second source, wherein the second gate is coupled to the first gate, and the second drain is coupled to the input-output pad; and
   a third transistor comprising a third gate, a third drain, and a third source, wherein the third gate is coupled to the second source, and the third drain is coupled to the first drain.

3. The trigger circuit as claimed in claim 2, wherein each of the first and second transistors is an N-type transistor, and the third transistor is a P-type transistor.

4. The trigger circuit as claimed in claim 2, wherein the protection circuit comprises:
   a fourth transistor comprising a fourth gate, a fourth drain, and a fourth source, wherein the fourth gate receives the first operation voltage, and the fourth source is coupled to the second source;
   a fifth transistor comprising a fifth gate, a fifth drain, and a fifth source, wherein the fifth gate receives the system enable signal, the fifth drain is coupled to the fourth drain, and the fifth source receives the first operation voltage; and
   a sixth transistor comprising a sixth gate, a sixth drain, and a sixth source, wherein the sixth gate is coupled to the fifth drain, the sixth drain is coupled to the core circuit, and the sixth source receives the first operation voltage.

5. The trigger circuit as claimed in claim 4, wherein the fourth transistor is a P-type transistor, and each of the fifth and sixth transistors is an N-type transistor.

6. The trigger circuit as claimed in claim 4, further comprising:
a level setting circuit providing a set voltage to a bulk of the third transistor and a bulk of the fourth transistor, wherein:
the third source receives a second operation voltage, and the set voltage is higher than a voltage of the third drain and a voltage of the fourth drain.

7. The trigger circuit as claimed in claim 6, wherein the level setting circuit comprises:
a seventh transistor comprising a seventh gate, a seventh drain, and a seventh source, wherein the seventh gate is coupled to the first drain, the seventh drain is coupled to the bulks of the third and fourth transistors, and the seventh source receives the second operation voltage; and
an eighth transistor comprising an eighth gate, an eighth drain, and an eighth source, wherein the eighth gate receives the second operation voltage, the eighth drain is coupled to the bulks of the third and fourth transistors, and the eighth source is coupled to the seventh gate.

8. The trigger circuit as claimed in claim 7, wherein each of the seventh and eighth transistors is a P-type transistor.

9. The trigger circuit as claimed in claim 7, wherein the first operation voltage is lower than the second operation voltage.

10. The trigger circuit as claimed in claim 7, wherein:
in response to the system enable signal being disabled or the ESD event occurring on the input-output pad, the sixth transistor provides the first operation voltage to the core circuit, and
in response to the system enable signal being enabled, the fifth transistor provides the first operation voltage to the sixth transistor to turn off the sixth transistor.

11. An operating circuit comprising:
a core circuit configured to set a voltage of a first input-output pad; and
a first trigger circuit coupled to the first input-output pad and comprising:
a first adjustment circuit adjusting the voltage of the first input-output pad to generate a first output voltage; and
a first protection circuit coupled between the first adjustment circuit and the core circuit and receiving a system enable signal,
wherein:
in response to the system enable signal being disabled or an ESD event occurring on the first input-output pad, the first protection circuit disables the core circuit according to the first output voltage, and
in response to the system enable signal being enabled, the first protection circuit stops disabling the core circuit.

12. The operating circuit as claimed in claim 11, wherein:
the core circuit comprises a driving transistor,
a gate of the driving transistor is coupled to a node, a drain of the driving transistor is coupled to the first input-output pad, and a source of the driving transistor receives a first operation voltage,
in response to a voltage of the node being equal to a second operation voltage, the driving transistor transmits the first operation voltage to the first input-output pad,
in response to the voltage of the node being equal to the first operation voltage, the driving transistor stops transmitting the first operation voltage to the first input-output pad.

13. The operating circuit as claimed in claim 12, further comprising:
a specific circuit receiving the system enable signal and an input signal,
wherein:
in response to the system enable signal being enabled, the specific circuit sets the voltage of the node according to the input signal,
in response to the system enable signal being disabled, the specific circuit stops setting the voltage of the node.

14. The operating circuit as claimed in claim 13, further comprising:
an ESD protection circuit coupled to the first input-output pad,
wherein in response to the ESD event occurring on the first input-output pad, the ESD protection circuit releases a ESD current to avoid the ESD current from entering the core circuit.

15. The operating circuit as claimed in claim 11, wherein the first adjustment circuit comprises:
a first transistor comprising a first gate, a first drain, and a first source, wherein the first gate is coupled to the first drain, and the first source receives the first operation voltage;
a second transistor comprising a second gate, a second drain, and a second source, wherein the second gate is coupled to the first gate, and the second drain is coupled to the first input-output pad; and
a third transistor comprising a third gate, a third drain, and a third source, wherein the third gate is coupled to the second source, and the third drain is coupled to the first drain.

16. The operating circuit as claimed in claim 15, wherein the first protection circuit comprises:
a fourth transistor comprising a fourth gate, a fourth drain, and a fourth source, wherein the fourth gate receives the first operation voltage, and the fourth source is coupled to the second source;
a fifth transistor comprising a fifth gate, a fifth drain, and a fifth source, wherein the fifth gate receives the system enable signal, the fifth drain is coupled to the fourth drain, and the fifth source receives the first operation voltage; and
a sixth transistor comprising a sixth gate, a sixth drain, and a sixth source, wherein the sixth gate is coupled to the fifth drain, the sixth drain is coupled to a level setting circuit, and the sixth source receives the first operation voltage.

17. The operating circuit as claimed in claim 16, further comprising:
a seventh transistor comprising a seventh gate, a seventh drain, and a seventh source, wherein the seventh gate is coupled to the first drain, the seventh drain is coupled to bulks of the third and fourth transistors, and the seventh source receives the second operation voltage; and
an eighth transistor comprising an eighth gate, an eighth drain, and an eighth source, wherein the eighth gate receives the second operation voltage, the eighth drain is coupled to the bulks of the third and fourth transistors, and the eighth source is coupled to the seventh gate.

18. The operating circuit as claimed in claim 17, wherein each of the first, second, fifth, and sixth transistors is an N-type transistor, and each of the third, fourth, seventh, and eighth transistors is a P-type transistor.

19. The operating circuit as claimed in claim 17, further comprising:
- a second trigger circuit coupled to a second input-output pad and comprising:
  - a second adjustment circuit adjusting a voltage of the second input-output pad to generate a second output voltage; and
  - a second protection circuit coupled between the second adjustment circuit and the core circuit and receiving the system enable signal,
- wherein:
- in response to the system enable signal being disabled or the ESD event occurring on the second input-output pad, the second protection circuit disables the core circuit according to the second output voltage, and
- in response to the system enable signal being enabled, the second protection circuit stops disabling the core circuit.

20. The operating circuit as claimed in claim 19, wherein:
- in response to the system enable signal being enabled, the second input-output pad receives a third operation voltage,
- the third operation voltage is higher than the first and second operation voltages,
- the second operation voltage is higher than the first operation voltage.

* * * * *